(12) United States Patent
Sato

(10) Patent No.: US 9,393,919 B2
(45) Date of Patent: Jul. 19, 2016

(54) RELAY, RELAY MODULE HAVING THE SAME, AND ELECTRICAL JUNCTION BOX

(71) Applicant: Yazaki Corporation, Tokyo (JP)

(72) Inventor: Koki Sato, Makinohara (JP)

(73) Assignee: Yazaki Corporation, Tokyo (JP)

( * ) Notice: Subject to any disclaimer, the term of this patent is extended or adjusted under 35 U.S.C. 154(b) by 42 days.

(21) Appl. No.: 14/046,046

(22) Filed: Oct. 4, 2013

(65) Prior Publication Data

US 2014/0106580 A1   Apr. 17, 2014

(30) Foreign Application Priority Data

Oct. 15, 2012   (JP) ................................ 2012-228200

(51) Int. Cl.
| | |
|---|---|
| *H01R 12/00* | (2006.01) |
| *B60R 16/023* | (2006.01) |
| *H01H 45/14* | (2006.01) |
| *H01H 50/14* | (2006.01) |
| *H01H 50/04* | (2006.01) |

(52) U.S. Cl.
CPC ............ *B60R 16/0239* (2013.01); *H01H 45/14* (2013.01); *H01H 50/14* (2013.01); *H01H 50/04* (2013.01)

(58) Field of Classification Search
CPC ............... H01R 13/719; H01R 23/722; H01R 2201/26; H05K 7/1069; H05K 7/1023; H05K 7/1084; H05K 7/026; H05K 3/308
USPC ...................... 439/68, 76.2, 70, 620, 24, 698
See application file for complete search history.

(56) References Cited

U.S. PATENT DOCUMENTS

| 4,668,032 A | * | 5/1987 | Bouvier et al. ................. 439/68 |
| 5,605,464 A | * | 2/1997 | Ikesugi et al. .................. 439/70 |
| 5,606,298 A | * | 2/1997 | Weiser ............................ 335/78 |

(Continued)

FOREIGN PATENT DOCUMENTS

| JP | S6-3146939 A | 6/1988 |
| JP | H0831292 A | 2/1996 |

(Continued)

OTHER PUBLICATIONS

Notification of First Office Action, issued in corresponding Chinese Patent Application No. CN 201310470498.3, dated May 28, 2015.

(Continued)

*Primary Examiner* — Hien Vu
(74) *Attorney, Agent, or Firm* — Locke Lord LLP; James E. Armstrong, IV; Brian S. Matross

(57) ABSTRACT

An object of the present invention is to provide a relay able to reduce a receiving space in a fitting direction between a terminal and a terminal fitting. A relay includes: a relay main body of which outer shape is in a rectangular parallelepiped shape; and four plate-shaped terminals projected from the relay main body and configured to be fitted with terminal fittings 4. The relay main body includes: an upper surface and a lower surface opposite to each other; two side surfaces opposite to each other; and two side surfaces opposite to each other. Four terminals are projected from the upper surface and bent at right angle two times so that tips of these terminals are opposite to the side surfaces. The tips of the two terminals are opposite to one side surface, and the tips of the remaining two terminals are opposite to the other side surface.

8 Claims, 11 Drawing Sheets

(56) References Cited

U.S. PATENT DOCUMENTS 5,673,011 A * 9/1997 Okihara et al. ............. 335/78
6,634,891 B1 * 10/2003 Cheng ........................ 439/68

FOREIGN PATENT DOCUMENTS

| JP | 2003-032846 A | 1/2003 |
| JP | 2005056700 A | 3/2005 |
| JP | 2010-221787 A | 10/2010 |

OTHER PUBLICATIONS

Second Office Action issued in corresponding Chinese Patent Application No. CN 201310470498.3.

Notification of Reasons for Refusal, issued in corresponding Japanese Patent Application No. JP 2012-228200, dated May 24, 2016.

* cited by examiner

12345# RELAY, RELAY MODULE HAVING THE SAME, AND ELECTRICAL JUNCTION BOX

CROSS REFERENCE TO RELATED APPLICATIONS

This application is on the basis of Japanese Patent Application No. 2012-228200, the contents of which are hereby incorporated by reference.

TECHNICAL FIELD

The present invention relates to a relay, a relay module defined by receiving the relay in a holding member, and an electrical junction box.

BACKGROUND ART

FIG. 10 is a perspective view showing a conventional relay. FIG. 11 is a perspective view showing a relay module defined by receiving the relay in a holding member. FIG. 12 is a plan view showing the relay module of FIG. 11. FIG. 13 is a sectional view taken on line A-A in FIG. 12.

As shown in FIG. 10, a conventional relay 301 includes: a relay main body 302 of which outer shape is in a rectangular parallelepiped shape; and a plurality of plate-shaped terminals 303 projected from a bottom surface 302n of the relay main body 302, and configured to be fitted with terminal fittings 304 (shown in FIG. 13). Further, a reference sign 302a denotes a top surface of the relay main body 302, and reference signs 302c to 302f denote side surfaces of the relay main body 302. Further, an arrow K denotes a fitting direction of the terminals 303 and the terminal fittings 304.

As shown in FIGS. 11 to 13, a conventional relay module 307 includes: the relay 301 shown in FIG. 10; the plurality of terminal fittings 304 configured to be fitted with the plurality of terminals 303 of the relay 301; and a holding member 306 to which the relay 301 and the terminals 304 are attached. Further, in FIG. 12, one of two relays 301 is not shown for explaining the holding member 306.

As shown in FIG. 13, each of the terminal fitting 304 includes a female connecting portion to be fitted with the terminal 303 of the relay 301. Further, each of the terminal fitting 304 is connected to an end of an electric wire 305.

The holding member 306 is made of synthetic resin. As shown in FIG. 11, this holding member 306 is provided with two relay mounts 363. The relay mount 363 is composed of a placing surface 360 on which the relay main body 302 is placed, a plurality of receiving chambers 361 formed below the placing surface 360 for receiving the terminals 303 and terminal fittings 304, and a lance 362 provided in each receiving chamber 361 for locking with the terminal fitting 304. Further, a reference sign 364 in FIG. 11 denotes a locking portion for locking with a case of such as an electrical junction box.

The above relay module 307 is, for example, received in a synthetic-resin-made case to compose an on-vehicle electrical junction box (see PTL 1).

CITATION LIST

Patent Literature

PTL 1: JP, A, 2010-221787

SUMMARY OF INVENTION

Technical Problem

However, in a structure such as an electrical junction box having the above conventional relay 301, a receiving space of which size is at least a height h11 of the relay main body 302 plus a height h12 of the holding member 306 is needed. Therefore, there is a problem that a size in a height direction, namely, a size in a fitting direction between the terminal 303 and the terminal fitting 304 becomes large. Incidentally, a height h12 of the holding member 306 is about several times larger than a length of the terminal 303.

Accordingly, an object of the present invention is to provide a relay able to reduce a receiving space in a fitting direction between a terminal and a terminal fitting, to provide a relay module having the relay, and to provide an electrical junction box having the relay.

Solution to Problem

For attaining the object, according to a first aspect of the present invention, there is provided a relay including:
a relay main body of which outer shape is in a rectangular parallelepiped shape; and
a plurality of terminals projected from the relay main body and configured to be fitted with terminal fittings,
wherein the plurality of terminals is projected from an upper surface of the relay main body and a tip of each terminal is bent so as to be opposite to a side surface of the relay main body.

According to a second aspect of the present invention, there is provided the relay as described in the first aspect, wherein the tips of the plurality of terminals are opposite to at least two side surfaces of the relay main body.

According to a third aspect of the present invention, there is provided a relay module including:
the relay as described in the first or second aspect;
a plurality of terminal fittings configured to be respectively fitted with the plurality of terminals of the relay; and
a holding member for receiving the relay and the plurality of terminal fittings.

According to a fourth aspect of the present invention, there is provided an electrical junction box including:
the relay as described in the first or second aspect;
a plurality of terminal fittings configured to be fitted with the plurality of terminals of the relay; and
a holding member for receiving the relay and the plurality of terminal fittings.

Advantageous Effects of Invention

According to the invention described in the first aspect, because the plurality of terminals is projected from an upper surface of the relay main body and a tip of each terminal is bent so as to be opposite to a side surface of the relay main body, a relay able to reduce a receiving space in a fitting direction between the terminal and the terminal fitting can be provided.

According to the invention described in the second aspect, because the tips of the plurality of terminals are opposite to at least two side surfaces of the relay main body, a relay able to reduce a receiving space in a fitting direction between the terminal and the terminal fitting can be provided.

According to the invention described in the third aspect, because a relay module including: the relay as described in the first or second aspect; a plurality of terminal fittings configured to be fitted with the plurality of terminals of the relay; and a holding member for receiving the relay and the plurality of terminal fittings, the relay module of which relay is able to reduce a receiving space in a fitting direction between the terminal and the terminal fitting can be provided.

According to the invention described in the fourth aspect, because an electrical junction box including: the relay as described in the first or second aspect; a plurality of terminal fittings configured to be fitted with the plurality of terminals of the relay; and a holding member for receiving the relay and the plurality of terminal fittings, the electrical junction box of which relay is able to reduce a receiving space in a fitting direction between the terminal and the terminal fitting can be provided.

These and other objects, features, and advantages of the present invention will become more apparent upon reading of the following detailed description along with the accompanied drawings.

DESCRIPTION OF EMBODIMENTS

First Embodiment

A relay, a relay module having the relay, and an electrical junction box according to a first embodiment of the present invention will be explained with reference to FIGS. 1 to 5.

Figure 1:
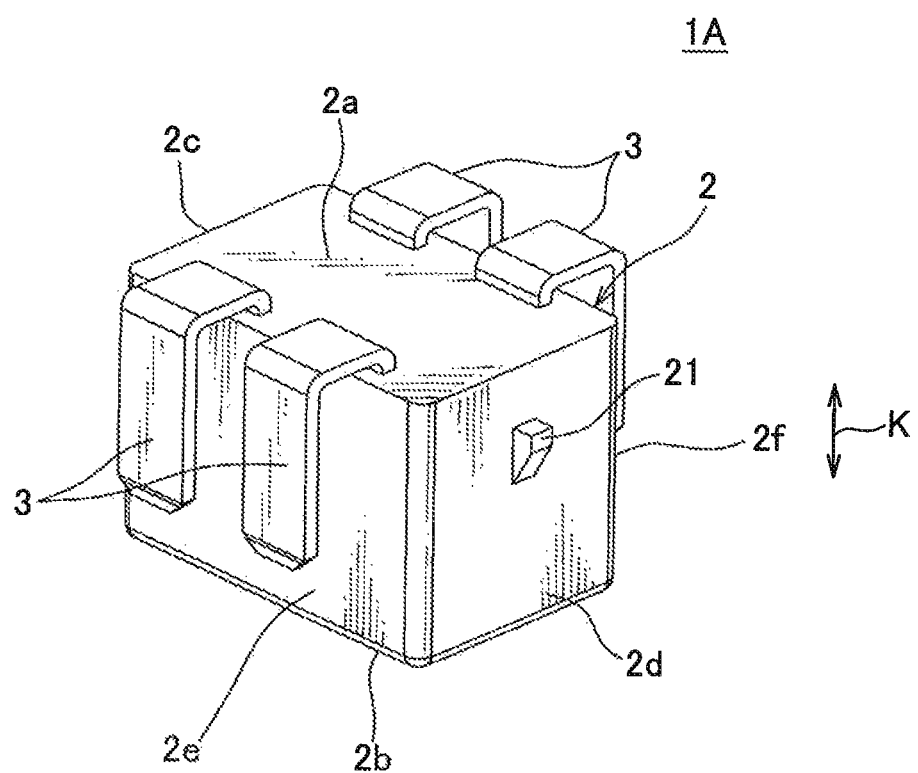
FIG. 1 is a perspective view showing a relay according to a first embodiment of the present invention.
Figure 4:
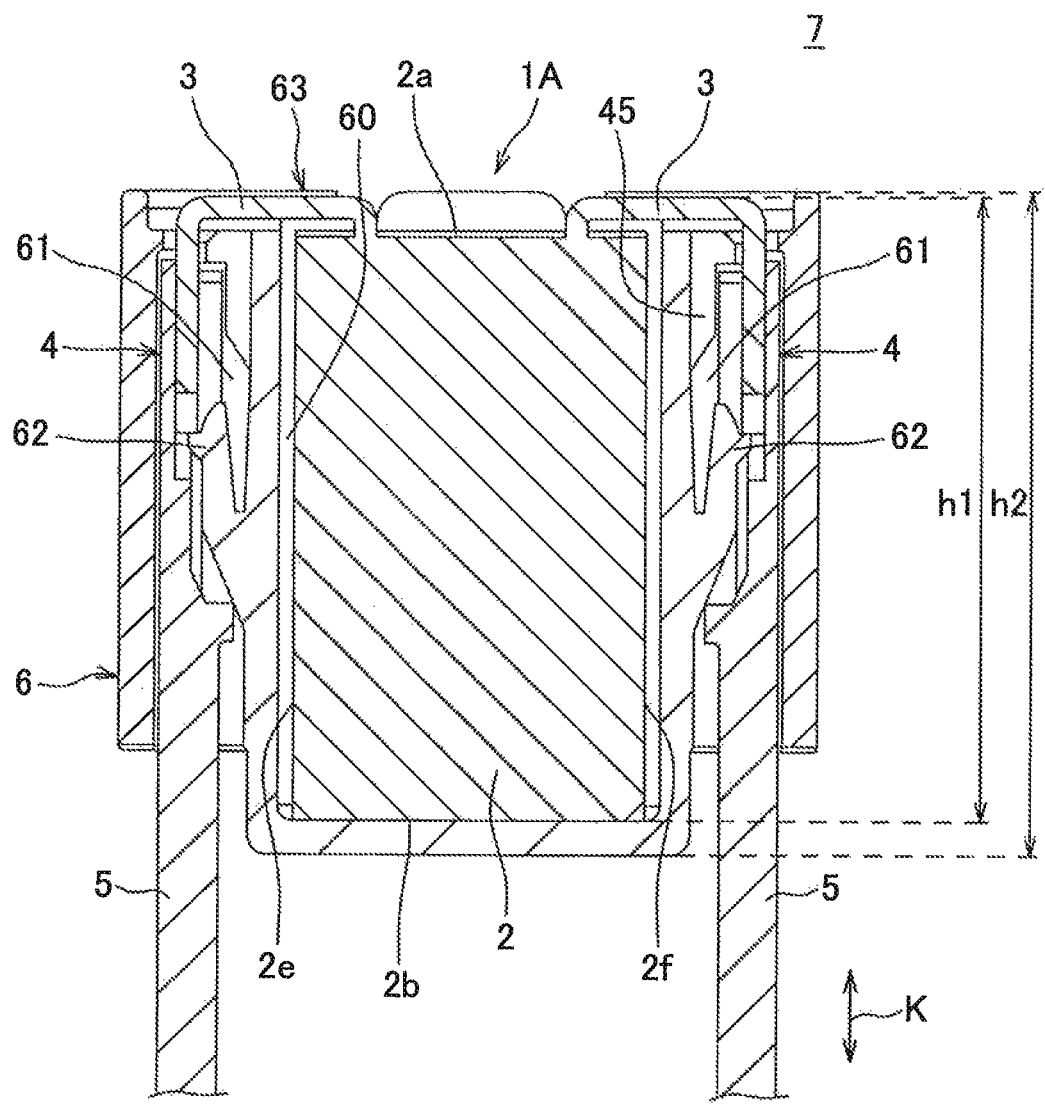
FIG. 4 is a sectional view taken on line B-B in FIG. 3.

A relay LA shown in FIG. 1 includes: a relay main body 2 of which outer shape is in a rectangular parallelepiped shape; and a plurality of plate-shaped terminals 3 projected from the relay main body 2 and configured to be fitted with terminal fittings 4 (shown in FIG. 4). Further, an arrow K denotes a fitting direction between the terminal 3 and the terminal fitting 4.

The relay main body 2 includes: an upper surface 2a and a lower surface 2b opposite to each other; side surfaces 2c and 2d opposite to each other; and side surfaces 2e and 2f opposite to each other. The upper surface 2a, the bottom surface 2b, and the side surfaces 2e, 2f are formed in substantially a rectangular shape. The side surfaces 2c and 2d are formed in substantially a square shape. Further, areas of the side surfaces 2c and 2d are smaller than areas of the side surfaces 2e and 2f. Further, the side surface 2d is provided with a locking projection 21 for locking with a holding member 6 (shown in FIG. 2).

In total, four terminals 3 are provided. Each of these terminals 3 is projected from the upper surface 2a and bent at right angle two times so that a tip of each terminal 3 is opposite to the side surfaces 2e, 2f. Further, in relay 1A, for reducing a whole length, a base end side of the terminal 3 is bent nearest the upper surface 2a possible. Further, the tips of two of four terminals 3 are opposite to the side surface 2e, and the tips of the remaining two terminals 3 are opposite to the side surface 2f.

Figure 2:
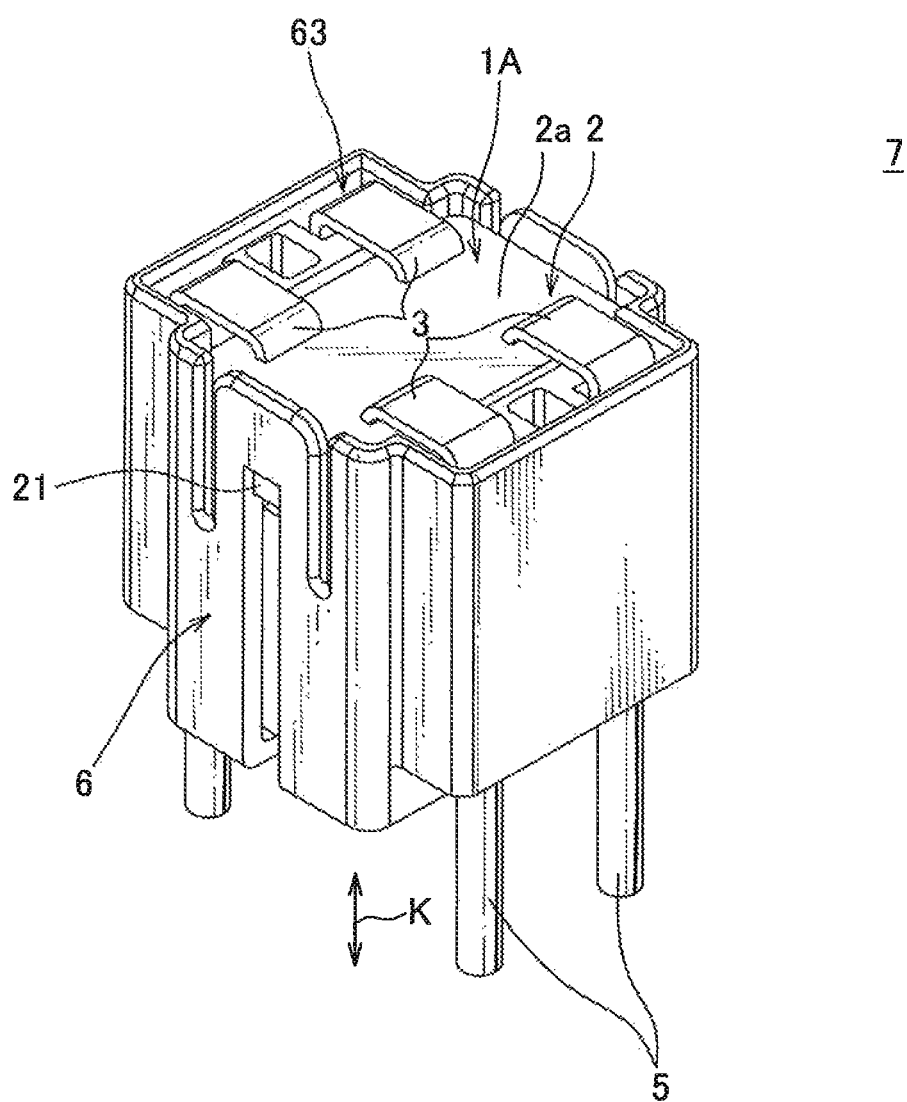
FIG. 2 is a perspective view showing a relay module receiving the relay shown in FIG. 1 in a holding member.
Figure 3:
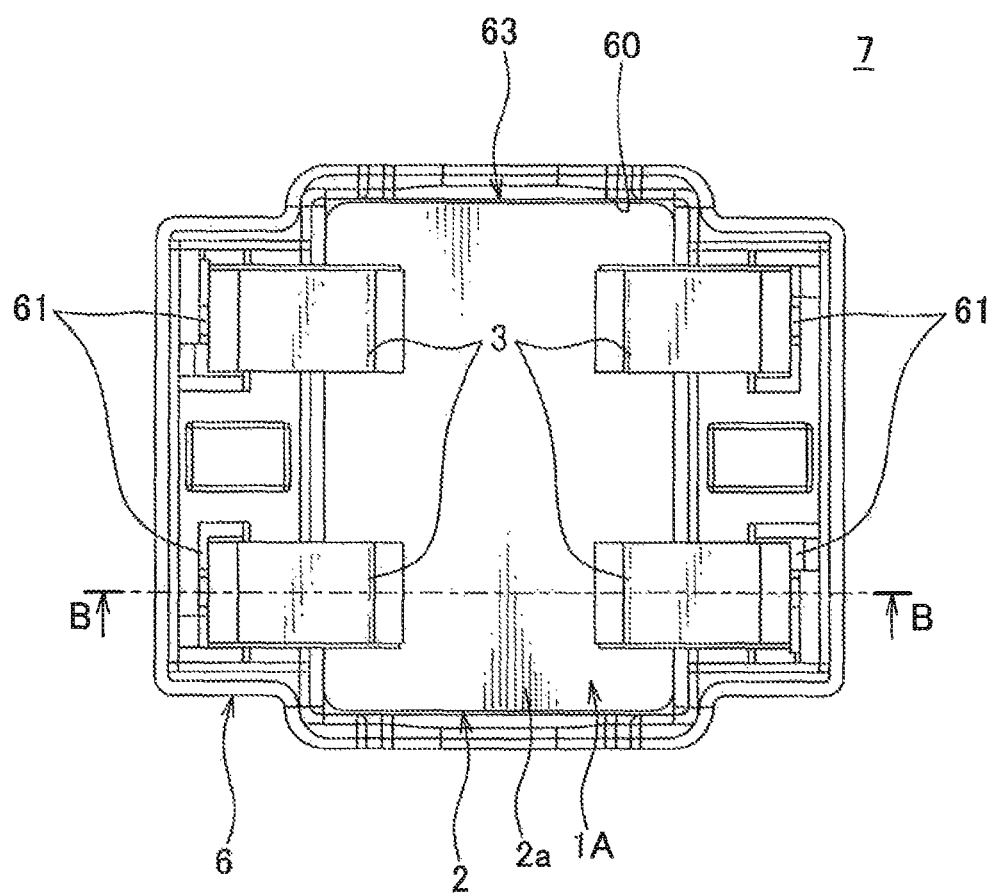
FIG. 3 is a plan view showing the relay module shown in FIG. 2.

A relay module 7 shown in FIGS. 2 to 4 includes: a relay 1A shown in FIG. 1; a plurality of terminal fittings 4 to be fitted with the terminals 3 of the relay 1A; and a holding member 6 receiving the relay 1A and the terminal fittings 4.

Figure 5:
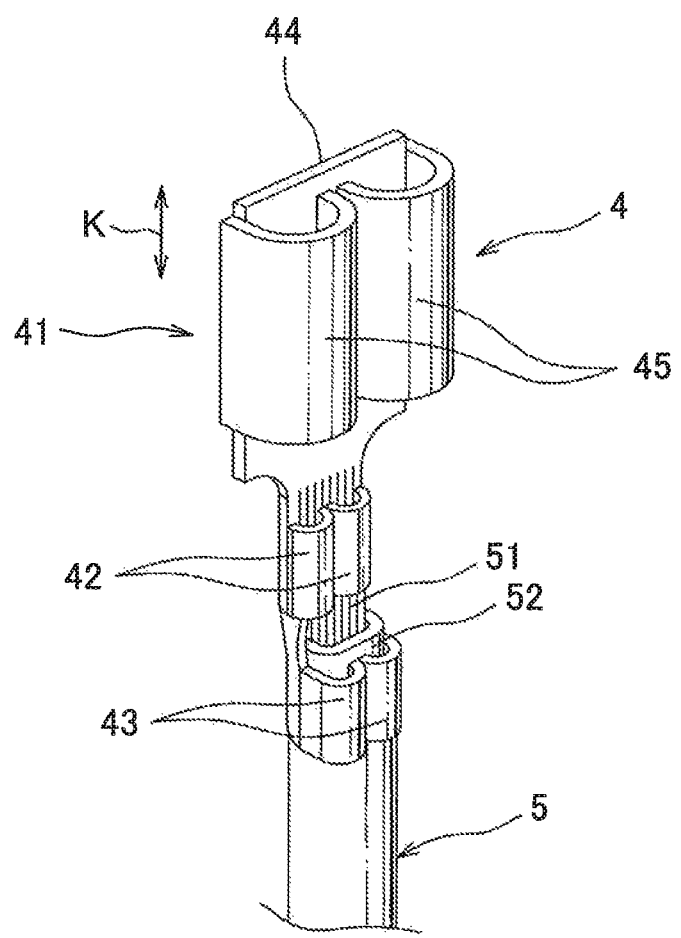
FIG. 5 is a perspective view showing an electric wire with a terminal fitting shown in FIG. 4.

As shown in FIG. 5, the terminal fitting 4 is made by pressing a metal plate or the like, and connected to an end of an electric wire 5. This terminal fitting 4 includes: a female connecting portion 41 to be fitted with the terminal 3 of the relay 1A; a pair of crimping pieces 42 to crimp an exposed core wire 51 from which an insulating cover 52 is removed at an end of the electric wire 5; and a pair of crimping pieces 43 to crimp the insulating cover 52. Further, the connecting portion 41 includes: a plate portion 44; and a pair of spring portions 45 extended vertically from both ends of the plate portion 44 and each tip is curved toward the plate portion 44. Such a terminal fitting 4 is fitted with the terminal 3 in a manner to hold the terminal 3 in between the plate portion 44 and the tips of the pair of spring portions 45.

Incidentally, the connecting portion 41 of the terminal fitting 4 is referred to as Faston type. However, according to the present invention, a shape of the connecting portion 41 is not limited to the Faston type. The connecting portion 41 may include: a tube able to receive the terminal 3; and a biasing spring provided in the tube. Further, the connecting portion 41 may be formed in a tuning fork shape having a slot into which the terminal 3 is inserted.

The holding member 6 is made of synthetic resin, and as shown in FIGS. 2 and 3, provided with one relay receiving portion 63. As shown in FIG. 4, the relay receiving portion 63 includes: a first receiving chamber 60 for receiving the relay main body 2; second receiving chambers 61 provided by two in both sides of the first receiving chamber 60 for receiving the terminals 3 and the terminal fittings 4; and lances 62 respectively provided in the second receiving chambers 61 for locking with the terminals 4. The first receiving chamber 60 is opened upward and formed in a concave shape. The second receiving chamber 61 is opened upward and downward, and formed in a tubular shape. The lance 62 is extended from an inner surface of the second receiving chamber 61. Further, the lance 62 holds the terminal fitting 4 by locking with an edge of the spring portion 45 of the terminal fitting 4.

Incidentally, in this embodiment, the holding member 6 is provided with one relay receiving portion 63. However, according to the present invention, the holding member 6 may be provided with a plurality of relay receiving portions 63.

When assembling such a relay module 7, previously the terminal fitting 4 is connected to an end of the electric wire 5. Then, the electric wire 5 having the terminal fitting 4 is inserted upward from a bottom of the second receiving chamber 61 into an inside of the second receiving chamber 61 so that the terminal fitting 4 is locked with the lance 62. Then, the relay 1A is inserted downward into the first and second receiving chambers 60, 61 from a top of the holding member so that the terminals 3 are respectively fitted with the terminal fittings 4, and thereby, the relay module 7 is assembled.

The electrical junction box includes: the relay module 7; and a synthetic-resin-made case for receiving the relay module 7. Further, the electrical junction box is mounted on a vehicle to supply electric power or signal to on-vehicle electronic devices. Further, in the present invention, a junction block (or a junction box), a fuse block (or a fuse box), and a relay block (or a relay box) are hereinafter collectively referred to as an electrical junction box.

Further, according to the electrical junction box of this embodiment, the holding member 6 is separated from the case. However, the present invention is not limited to this. The holding member 6 may be integrally formed with the case. Namely, the holding member 6 may be a part of the case of the electrical junction box.

As explained above, according to the present invention, the plurality of terminals 3 of the relay 1A is projected from the upper surface 2a of the relay main body 2. The tip of the terminal 3 is bent so as to be opposite to the side surfaces 2e, 2f, and the base end of the terminal 3 is bent near the upper surface 2a. Therefore, the whole height of the relay 1A (denoted by h1 in FIG. 4) is substantially the same as the height of the relay main body 2. In the relay module 7 having such a relay 1A, the whole height of the holding member 6 (denoted by h2 in FIG. 4) is not the combined size of the height of the first receiving chamber 60 and the height of the second receiving chambers 61, but only the height of the first receiving chamber 60. Therefore, the receiving space of the relay module 7 in the electrical junction box can be lower, and the whole height of the electrical junction box can be lower.

Further, according to the present invention, the relay module 7 and the electrical junction box may include later-described relays 1B to 1E according to the second to fifth embodiments instead of the above relay 1A.

Second Embodiment

Figure 6:
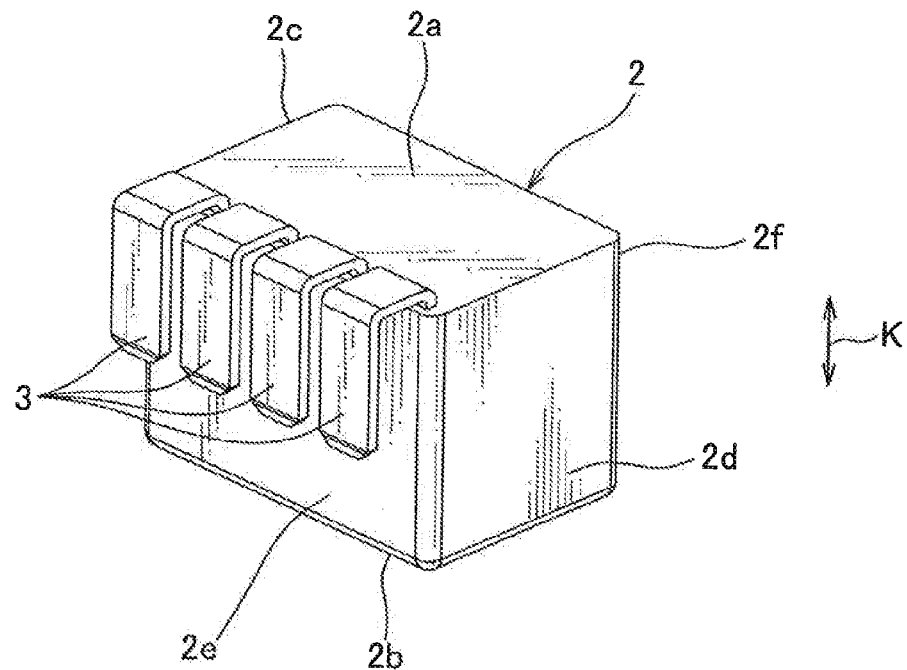
FIG. 6 is a perspective view showing a relay according to a second embodiment of the present invention.

A relay according to a second embodiment of the present invention will be explained with reference to FIG. 6. In FIG. 6, the same components as the first embodiment are denoted by the same reference signs, and an explanation thereof is omitted.

A relay 1B shown in FIG. 6 includes four terminals 3. All the terminals 3 are projected from the upper surface 2a of the relay main body 2, and bent at right angle twice. The tips of the terminals 3 are opposite to the side surface 2e. Further, the four terminals 3 are arranged in line in a direction perpendicular to the arrow K.

Third Embodiment

Figure 7:
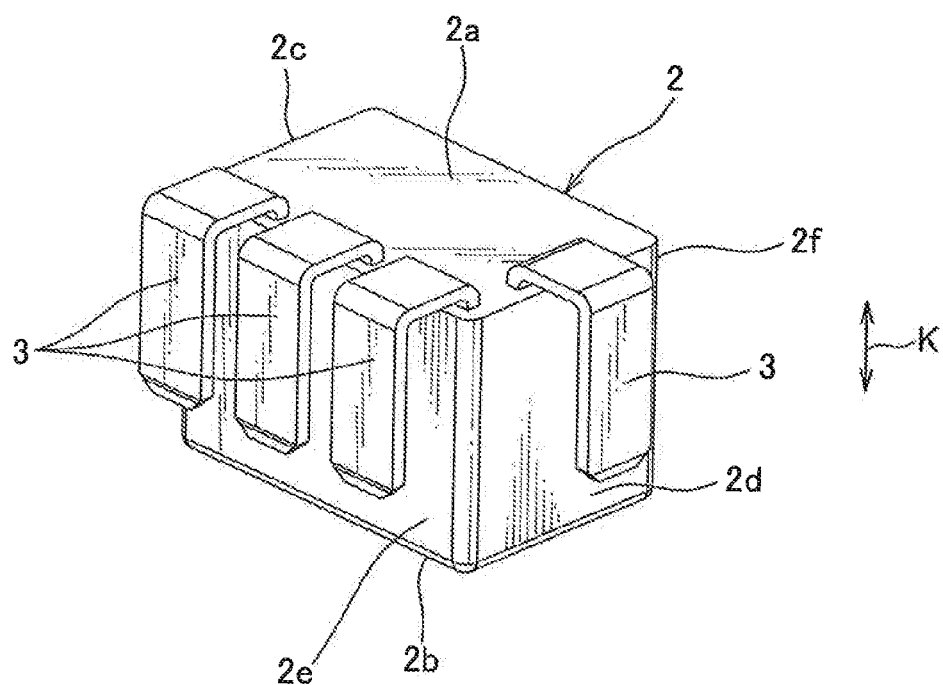
FIG. 7 is a perspective view showing a relay according to a third embodiment of the present invention.

A relay according to a third embodiment of the present invention will be explained with reference to FIG. 7. In FIG. 7, the same components as the first and second embodiments are denoted by the same reference signs, and an explanation thereof is omitted.

A relay 1C shown in FIG. 7 includes four terminals 3. Three of then are projected from the upper surface 2a of the relay main body 2, and bent at right angle twice. The tips of the three terminals 3 are opposite to the side surface 2e. These three terminals 3 are arranged in line in a direction perpendicular to the arrow K. Further, the remaining one terminal 3 is projected from the upper surface 2a of the relay main body 2, and bent at right angle twice. The tip of the remaining one terminal 3 is opposite to the side surface 2d.

Fourth Embodiment

Figure 8:
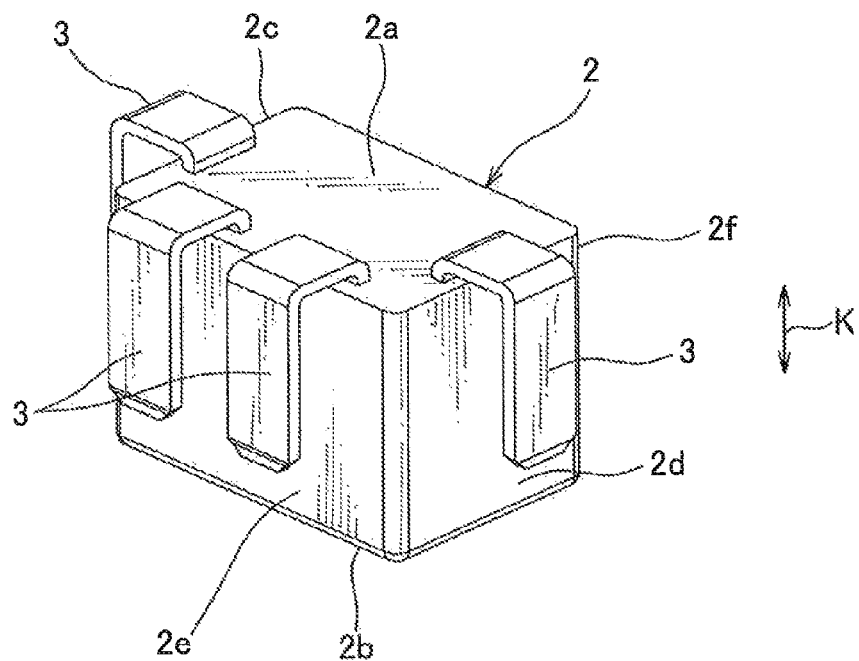
FIG. 8 is a perspective view showing a relay according to a fourth embodiment of the present invention.

A relay according to a fourth embodiment of the present invention will be explained with reference to FIG. 8. In FIG. 8, the same components as the first to third embodiments are denoted by the same reference signs, and an explanation thereof is omitted.

A relay 1D shown in FIG. 8 includes four terminals 3. Two of them are projected from the upper surface 2a of the relay main body 2, and bent at right angle twice. The tips of the two terminals 3 are opposite to the side surface 2e. The other one terminal 3 is projected from the upper surface 2a of the relay main body 2, and bent at right angle twice. The tip of the other one terminal 3 is opposite to the side surface 2c. Further, the remaining one terminal 3 is projected from the upper surface 2a of the relay main body 2, and bent at right angle twice. The tip of the remaining one terminal 3 is opposite to the side surface 2d.

Fifth Embodiment

Figure 9:
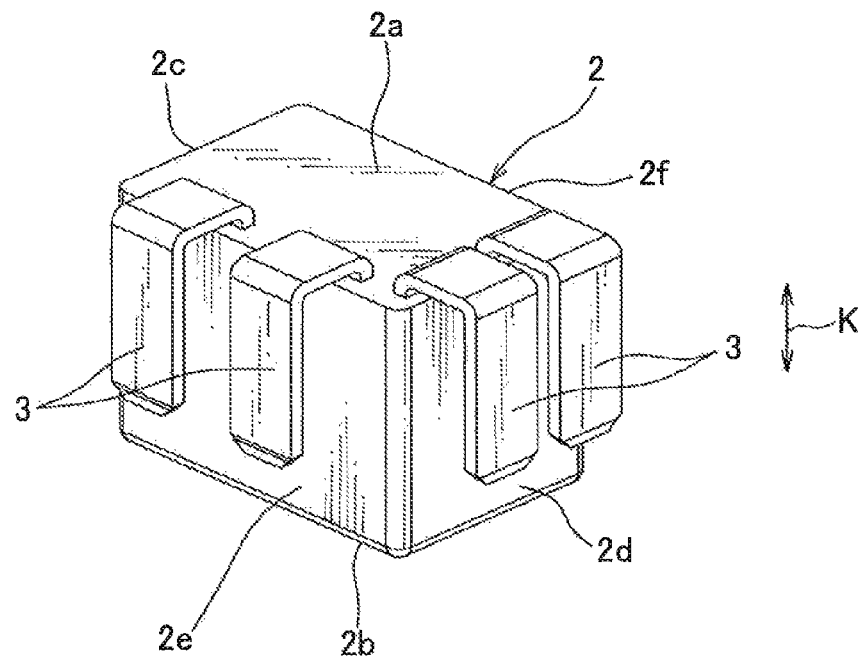
FIG. 9 is a perspective view showing a relay according to a fifth embodiment of the present invention.
Figure 10:
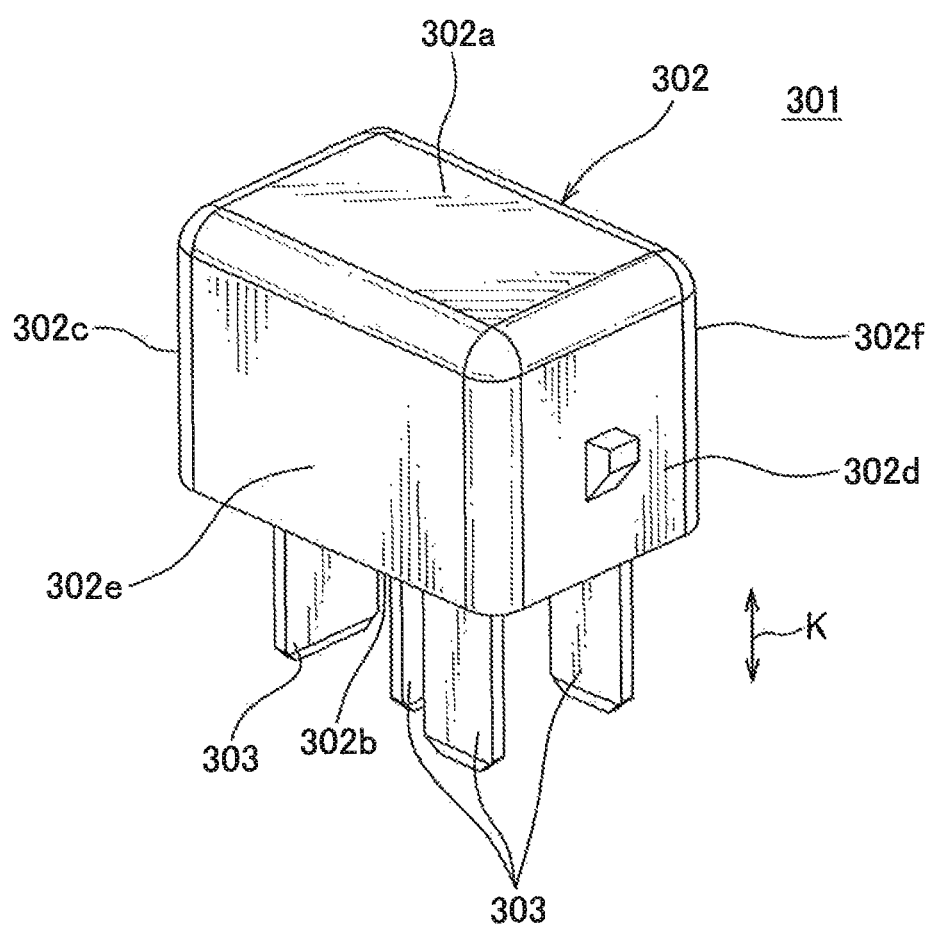
FIG. 10 is a perspective view showing a conventional relay.
Figure 11:
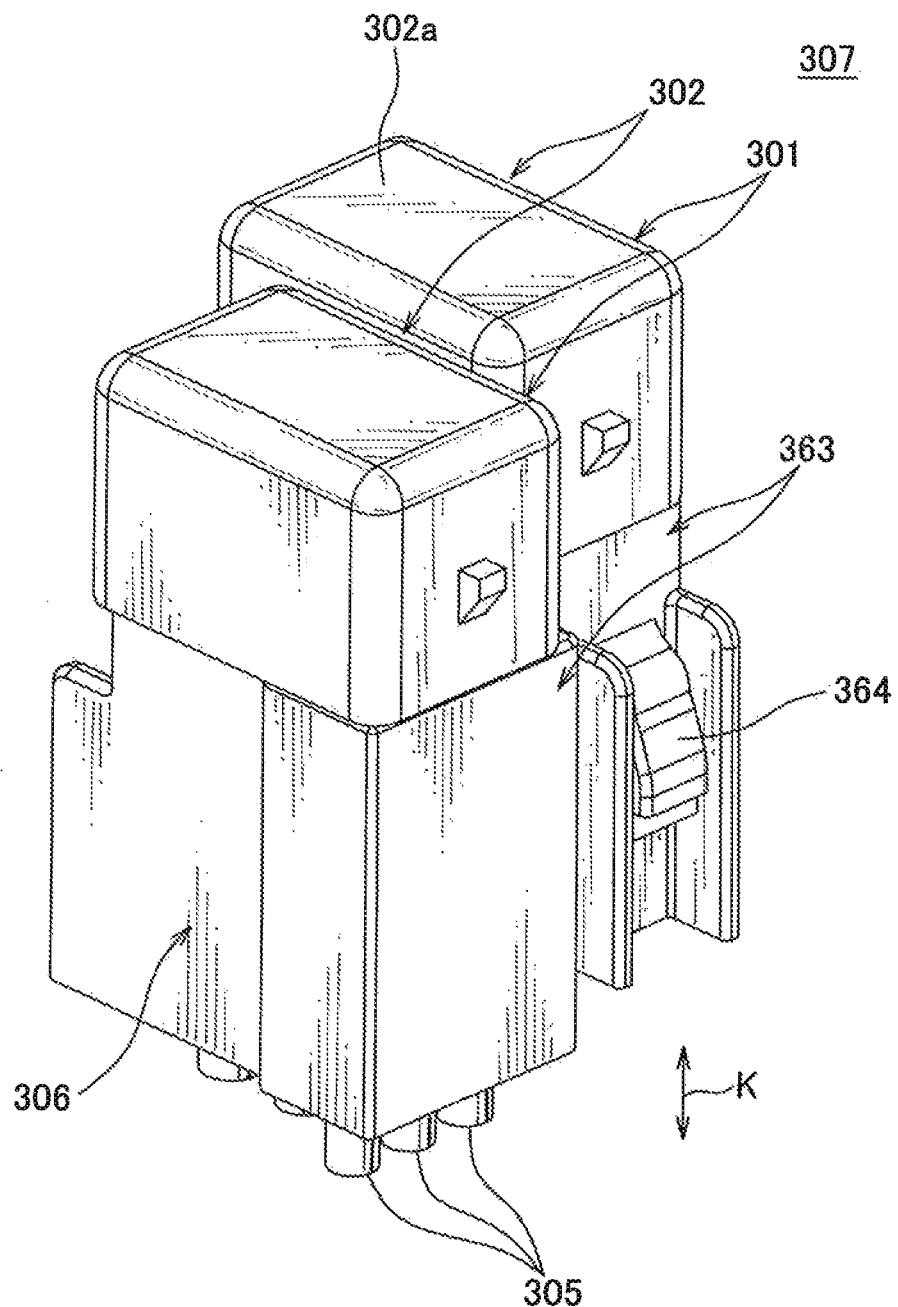
FIG. 11 is a perspective view showing a relay module receiving the relay shown in FIG. 10 in a holding member.
Figure 12:
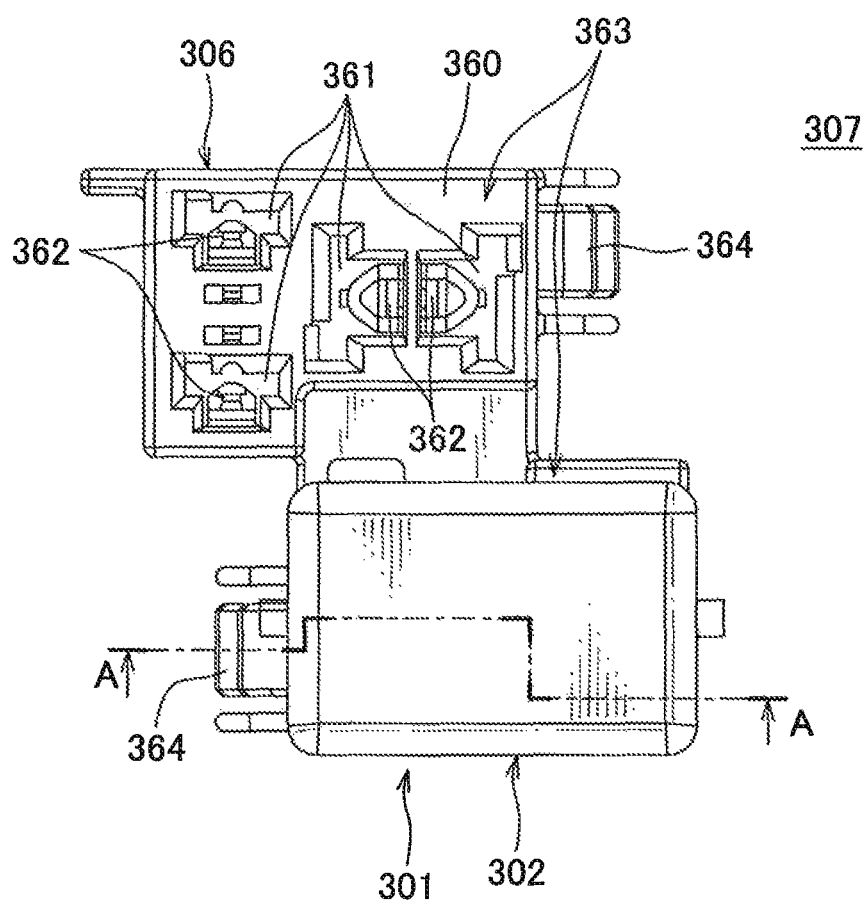
FIG. 12 is a perspective view showing a conventional relay module.
Figure 13:
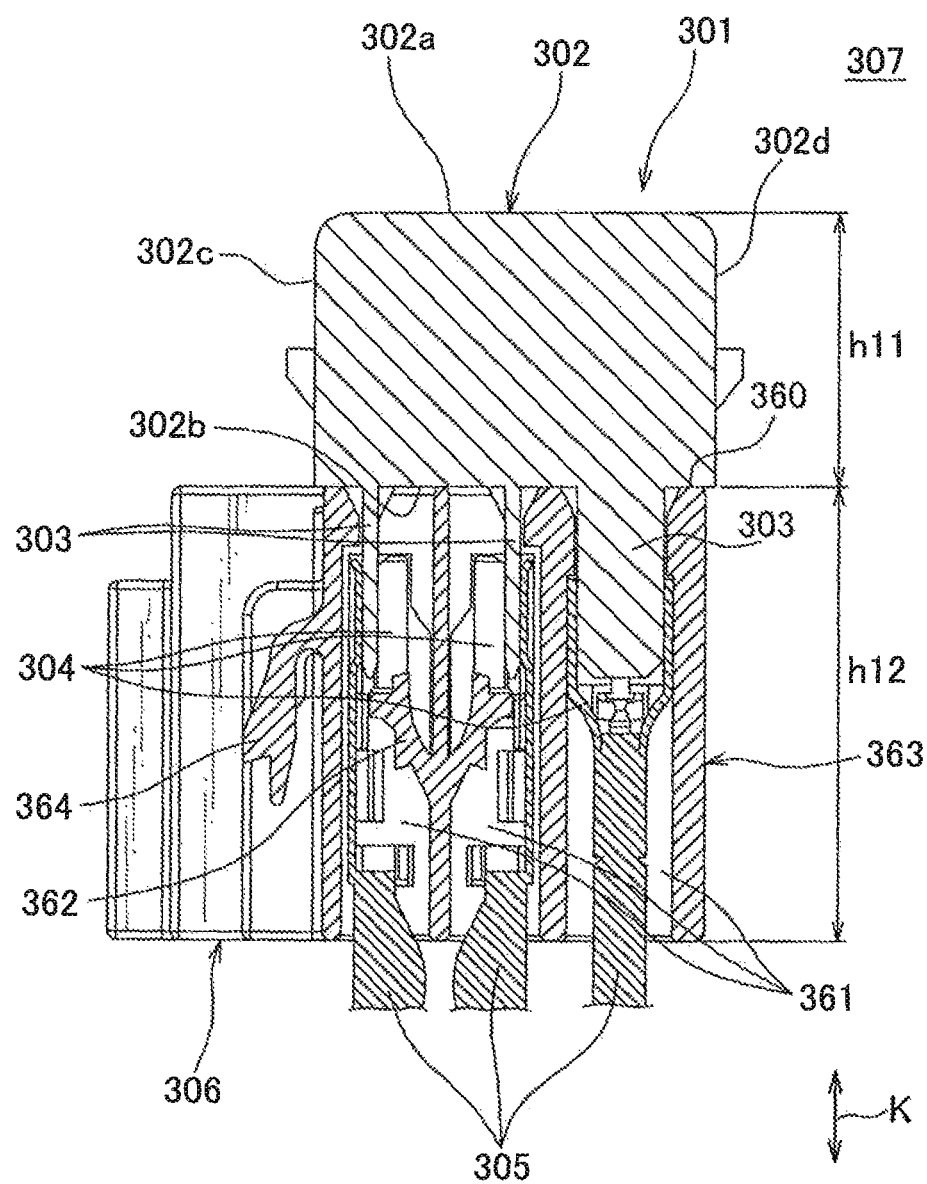
FIG. 13 is a sectional view taken on line A-A in FIG. 12.

A relay according to a fifth embodiment of the present invention will be explained with reference to FIG. 9. In FIG. 9, the same components as the first to fourth embodiments are denoted by the same reference signs, and an explanation thereof is omitted.

A relay 1D shown in FIG. 9 includes four terminals 3. Two of them are projected from the upper surface 2a of the relay main body 2, and bent at right angle twice. The tips of the two terminals 3 are opposite to the side surface 2e. Further, the remaining two terminals 3 are projected from the upper surface 2a of the relay main body 2, and bent at right angle twice. The tips of the remaining two terminals 3 are opposite to the side surface 2d.

Further, the relays 1A to 1E according to the first to fifth embodiments are respectively include four terminals 3, however, according to the present invention, the relay may include five terminals 3.

The invention has been described in connection with what are presently considered to be the most practical and preferred embodiments. However, the present invention has been presented by way of illustration and is not intended to be limited to the disclosed embodiments. Accordingly, those skilled in the art will realize that the invention is intended to encompass all modifications and alternative arrangements included within the spirit and scope of the invention, as set forth by the appended claims.

REFERENCE SIGNS LIST 1A to 1E relay
2 relay main body
2a upper surface
2c to 2f side surface
3 terminal
4 terminal fitting
6 holding member
7 relay module

What is claimed is:
1. A relay module, comprising:
a relay main body of which outer shape is in a rectangular parallelepiped shape having an upper surface; and
a plurality of terminals projected from the relay main body with each configured to be fitted with a corresponding one of a plurality of terminal fittings in a holding member,
wherein each of the plurality of terminals is projected from the upper surface of the relay main body and being bent downwardly such that a tip of each of the plurality of terminals opposes a side surface of the relay main body;

wherein each of the plurality of terminals and the relay main body defines a gap therebetween; and wherein the holding member defines a receiving portion having a first receiving chamber configured to receive the relay main body and a second receiving chamber configured to receive the plurality of terminals and the plurality of terminal fittings, and has at least one lance extending from an inner surface of the second receiving chamber configured to lock to an edge of a spring portion of at least one of the plurality of terminal fittings.

2. The relay module as claimed in claim 1,
wherein the tips of the plurality of terminals are opposite to at least two side surfaces of the relay main body.

3. An electrical junction box comprising:
the relay module as claimed in claim 1.

4. An electrical junction box, comprising: The relay module as claimed in claim 2.

5. The relay module as claimed in claim 1, wherein the gap is configured to receive a portion of a respective terminal fitting.

6. The relay module as claimed in claim 1, wherein the tip of each terminal is offset from one of a plurality of side surfaces of the relay main body.

7. The relay module as claimed in claim 1, wherein each terminal projects upward from the upper surface of the relay main body and is bent at right angle at two portions thereof.

8. The relay module as claimed in claim 1, wherein a proximal end portion of each terminal is bent in a vicinity of the upper surface.

* * * * *